3,060,307
APPARATUS AND METHOD FOR PRODUCING
ALLOY WELDS
Roman F. Arnoldy, Houston, Tex., assignor to R. I. Patents, Inc., Houston, Tex., a corporation of Texas
Filed Sept. 21, 1960, Ser. No. 57,525
9 Claims. (Cl. 219—130)

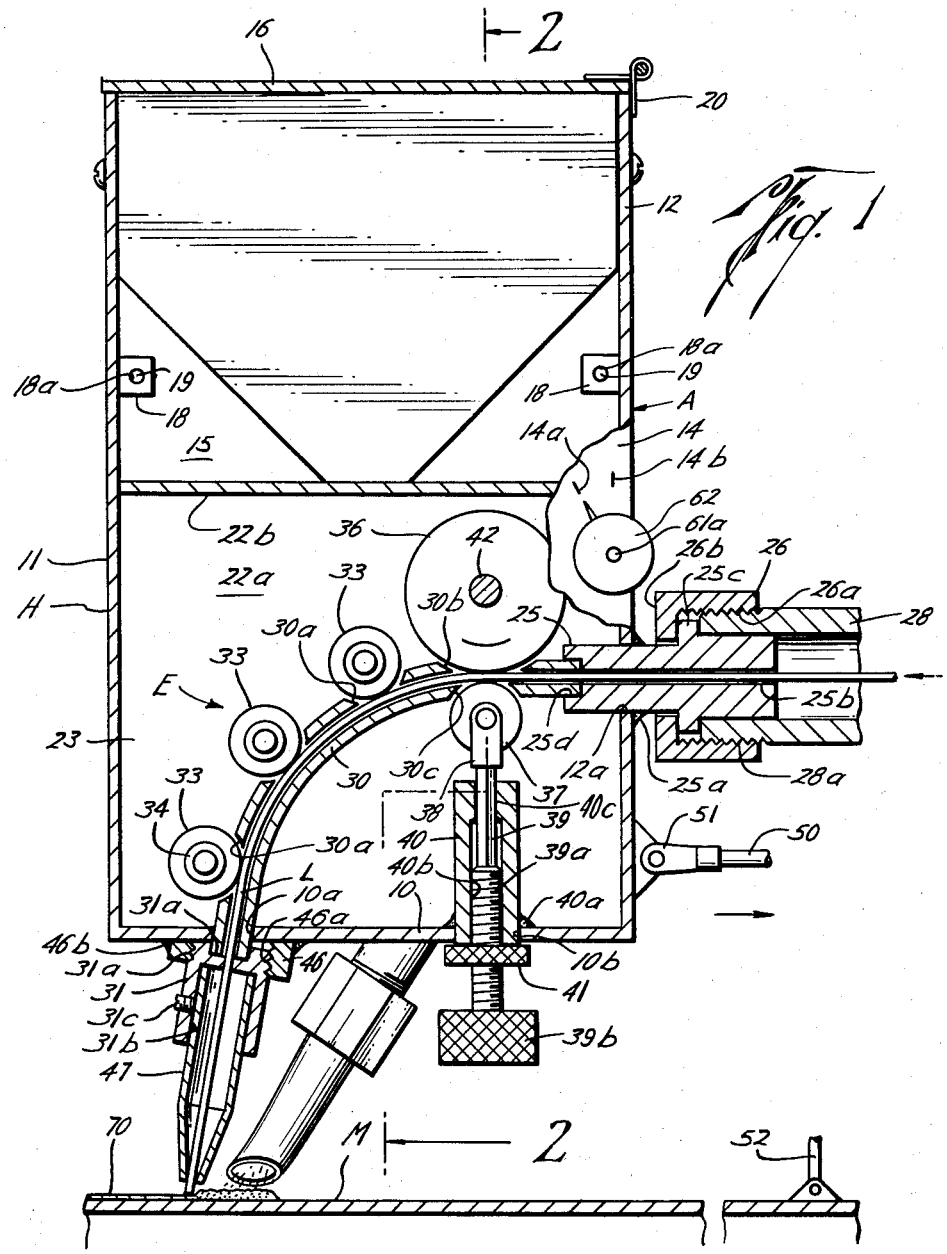

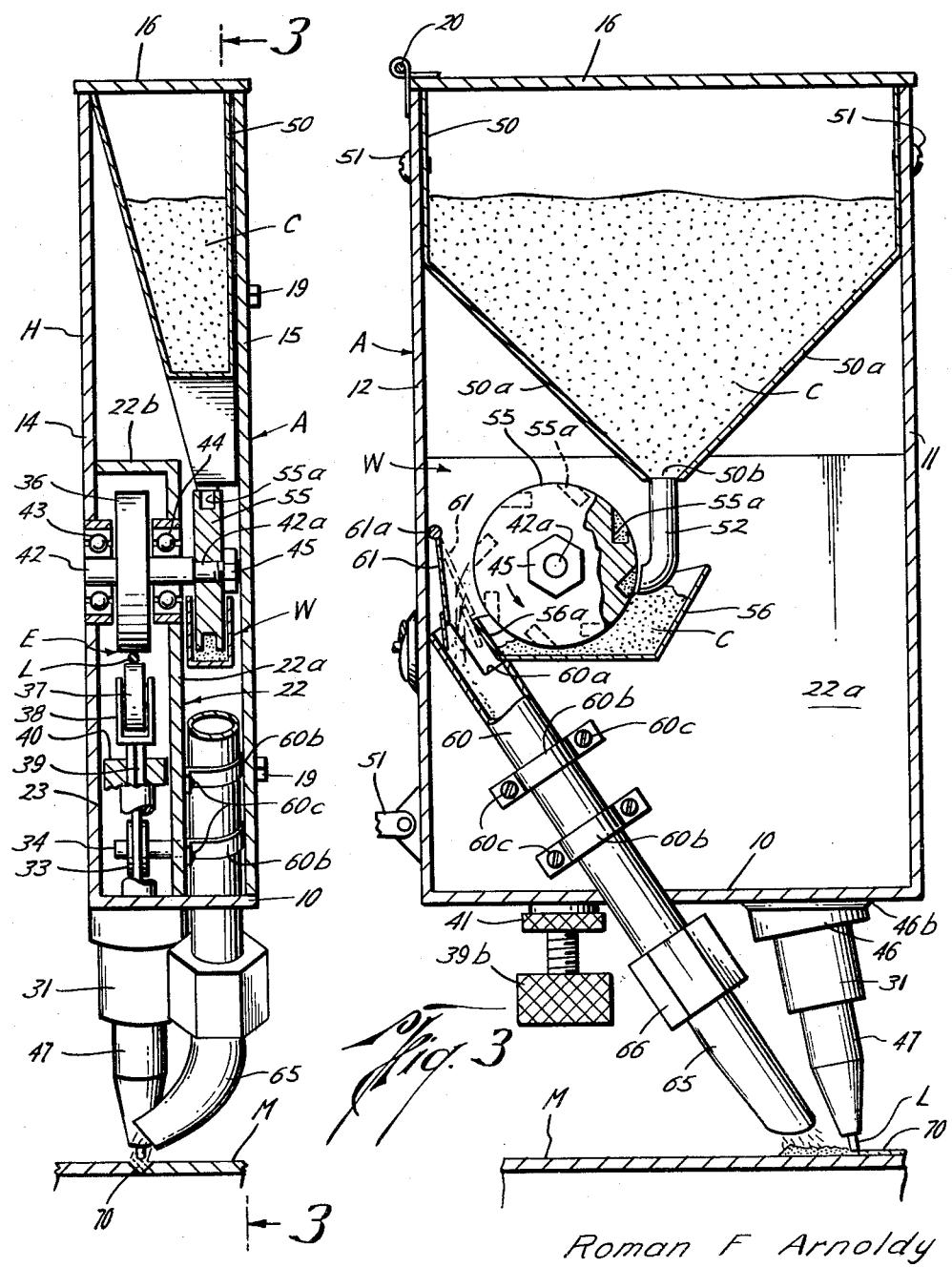

This invention relates to apparatus and methods for producing alloy welds.

In my copending United States patent application, Serial No. 39,193, filed June 27, 1960, now abandoned, it was pointed out that prior to the invention of said application, the problem of depositing alloy weld coatings heretofore had been approached in one of the following four ways:

(1) the drawn wire method;
(2) the cast rod method;
(3) alloy powder in ductile tube method; and,
(4) the submerged melt alloy in the flux method.

In the drawn wire method an alloy of approximately the coating analysis desired is drawn into wire which is then used as a manual electrode or fed as a bare wire in a submerged melt or in metal inert gas welding operations. This method is limited because many alloys cannot be drawn into wire and others can be so drawn only with great difficulty and considerable expense. Also the analysis of the deposited hardfacing is not accurately predictable or readily controlled because the arc is directly with the base metal which causes an unequal and poorly controllable dilution of the weld coating.

In the cast rod method used usually in hardfacings, the welding rods are cast in lengths up to fourteen (14) inches which seems to be a practical limit in manufacturing. Because of such short lengths, cast rods are satisfactory for manual welding only and are not long enough for practical use in automatic or semi-automatic welding equipment where the electrode rod is generally coiled in lengths of as much as a hundred foot or more. If the relatively short lengths of the cast weld rod were employed in automatic or semi-automatic welding apparatus, the time required for inserting each new rod would be so excessive compared to normal operations that one of the main purposes of the automatic or semi-automatic welding equipment would be defeated.

Furthermore, the external surface of the cast rod is so rough that it is practically impossible to feed such rods through the automatic or semi-automatic welding equipment. Even when cast rods are used in manual welding, the analysis of the deposited hardfacing is not predictable or readily controlled because the arc is directly with the base metal which causes an unequal and uncontrollable dilution of the deposited hardfacing.

With respect to the ductile tube method which is also used primarily for hardfacing, the welding arc, like in the cast rod method, is directly with the base metal so that the analysis of the deposited hardfacing is not closely controllable and variable, with variations for the individual constituents is selected areas varying up to 50% from the desired amount, and with variations of as much as 25% from the desired amount being common. Additionally, with the ductile tube method, the carbide forming elements or other hardness producing elements are carried in a tube of ductile metal which is the matrix metal. To obtain the best results with automatic or semi-automatic open arc welding, the diameter of the ductile tube should be about $7/64$ of an inch. If the analysis of the material to be deposited has about 60% or less of the ductile or matrix metal, the required wall thickness of the ductile tube becomes too thin to allow handling of the tube through the welding equipment without collapsing. Therefore, the ductile tube method is necessarily limited to analyses wherein the alloy forming elements or hardness producing elements are relatively low in amounts.

In the submerged melt alloy in the flux method, the alloy materials or hardness forming elements are mixed with the flux. A ductile metal electrode from a coil is positioned in such mixture and an electric arc is created through the mixture for melting the flux and the alloy materials. With such method, the amount of the alloy or hardness forming elements must necessarily be relatively low because the welding operation depends upon a high electrical resistance in the molten flux and alloy; if the alloy or hardness forming elements are present in too great an amount the molten flux and alloy will provide a low resistance conductor which is unsatisfactory for welding.

Another major disadvantage of the submerged melt alloy in the flux method is the inability to control the analysis of the deposited weld metal. This inability is due to the fact that the melting of the flux and alloy mixture and therefore the amount of the alloy deposited on the base metal is a function of the length of the electric arc through the mixture and therefore the voltage applied across the electrode as well as the current passing through it. Changes in either the voltage or the current affect the amount of the electrode and the alloy elements melted, but not in a proportional manner, and those factors have been found to be difficult, if not impossible, to control closely enough to accurately deposit the desired quantities of the alloy and the electrode metal on the base metal throughout any substantial area.

Also, in the previous electric arc welding methods, the electric arc is between the electrode and the material to which the weld metal is welded so that only about one-half of the heat of the arc has been used for melting the weld metal or facing.

In said application Serial No. 39,193, now abandon, a new and improved method is described by which many of the problems of the prior art are overcome as explained therein.

An object of this invention is to provide a new and improved apparatus and method for producing alloy welds wherein all of the advantages of the method of said application Serial No. 39,193, now abandoned, are obtained, and additionally, the manual depositing of the alloy powder and the physical measurement of the wire electrode are obviated.

An important object of this invention is to provide a new and improved apparatus and method for producing alloy welds, either as fusion welds or as weld coatings, wherein the alloy powder and the electrode wire for the welding are fed and deposited in controlled quantities on the area to be welded without requiring manual depositing of the powder or physical measurement of the electrode wire.

Another object of this invention is to provide a new and improved method and apparatus for applying alloy welds which is usable with semi-automatic welding equipment, that is, welding equipment which is automatically fed but is manually guided.

A further object of this invention is to provide a new and improved apparatus for automatically coordinating the depositing of an alloy powder and an electrode wire to form an alloy weld having a closely controlled analysis.

A particular object of this invention is to provide an apparatus wherein the feeding and disposing of a welding composition on the work is synchronized with the feeding and depositing of a wire electrode on the work by a feeding means for the welding composition which is driven in response to the feeding of the wire electrode.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section illustrating the apparatus of this invention, and particularly illustrating the wire electrode feeding and guiding portion of the apparatus;

FIG. 2 is a view taken on line 2—2 of FIG. 1 and illustrates the relationship between the wire electrode feeding and guiding mechanism of the apparatus and the welding composition feeding mechanism portion of the apparatus; and, FIG. 3 is a view, partly in section and partly in elevation taken on line 3—3 of FIG. 2 and illustrating in particular the welding composition mechanism portion of the apparatus of this invention.

In the drawings, the letter A designates generally the apparatus of this invention which is adapted to be used in carrying out the method of this invention. The apparatus A broadly includes a support or housing H which has mounted therewith a weld composition feeding mechanism W and a wire electrode feeding mechanism E. As will be explained in detail, the operation of the welding composition feeding mechanism W and the wire electrode feeding mechanism E is coordinated so that controlled quantities of a welding composition C and a wire electrode L are deposited on a material M which is to be fusion welded or coated with a weld surfacing. The apparatus and method of this invention are therefore particularly applicable in connection with the producing of alloy weld coatings and fusion welds wherein the particular quantities of the alloy are to be controlled within certain desired limits.

Considering the invention more in detail, the support or housing H in the form illustrated is provided with a bottom plate 10, end plates 11 and 12, side plates 14 and 15, and a top cover or door 16. The bottom plate 10 is preferably integral with or welded to the end plates 11 and 12, and also the side plate 14. The side plate 15 is preferably removable, and as illustrated, a plurality of brackets 18 are provided on the end plates 11 and 12 for receiving bolts or screws 19 which extend through the plate 15 and into suitable threaded openings 18a in the brackets 18. The brackets 18 are generally welded or otherwise suitably secured to the end plates 11 and 12. The cover or door 16 is mounted on the end plate 12 at its upper end by means of a hinge 20 of any conventional construction so that the cover or door 16 may be pivoted upwardly from its closed position shown in FIGS. 1 and 3 to an open position for exposing the interior of the housing H, for a purpose to be hereinafter described.

Referring now to FIGS. 1 and 2 in particular, it can be seen that the housing H has an internal frame 22 which is provided with a vertical portion 22a and a horizontal upper portion 22b. Such frame 22 is welded or is otherwise secured to the internal joining surfaces of the housing H so as to form an internal compartment 23 in which the wire electrode feeding mechanism E is principally disposed.

The mechanism E includes a cylindrical sleeve 25 which is welded as indicated at 25a or is otherwise suitably secured to the end plate 12 of the housing H. Such sleeve 25 extends through a suitable opening 12a in such end plate 12 as shown in FIG. 1. The sleeve 25 has an internal bore or hole 25b through which the wire electrode L passes. An annular flange 25c is provided on the external surface of the sleeve 25 outwardly of the housing H for receiving and holding thereon a coupling member 26 which is cylindrical and which has internal threads 26a formed thereon. An inwardly extending flange portion 26b on the coupling member 26 is adapted to engage the flange 25c to limit the movement of the coupling member 26 to the right as viewed in FIG. 1. A support tube or pipe 28 which has external threads 28a in threaded engagement with the internal threads 26a of the coupling member 26 is secured to the coupling member 26 and is preferably threaded thereon until it contacts the flange 25c. The support tube or pipe 28 in normal use is connected to a semi-automatic welding machine, or an automatic welding machine, so that the entire apparatus A of this invention is thereby supported on the welding apparatus (not shown). If such support pipe 28 is not employed for the supporting of the apparatus A of this invention, any other type of support may be used such as a handle which is adapted to be grasped by the operator, or alternatively, the apparatus A may be supported by a cable suspended from an overhead support in the area in which the apparatus A is being used.

The internal end of the guide sleeve 25 is provided with a recess 25d into which extends a curved guide tube 30. The guide tube 30 may be welded or otherwise secured in such recess 25d. The tube 50 curves at substantially a right-angle and the lower end thereof extends into a recess 31a of a nozzle mounting cylinder 31. The sleeve 30 also passes through a suitable opening 10a in the bottom plate 10 so that the lower end of such tube 30 projects below the bottom plate 10 and into such recess 31a as shown in FIG. 1.

The tube 30 serves to guide the wire electrode L as it is fed through the apparatus A so as to change the direction of movement of the wire electrode L from a substantially horizontal position as it is fed to the apparatus A from the semi-automatic welding equipment to a substantially vertical position as it is fed to the material M to be welded or weld coated. The tube 30 has a plurality of openings 30a formed therethrough at intervals for receiving guide and bending wheels 33. Such wheels or rollers 33 may be mounted in any suitable way, but preferably they are mounted on axles 34 which are threaded or are otherwise suitably connected to the vertical frame portion 22a.

In addition to the openings 30a, the guide tube 30 also has an enlarged opening 30b for receiving a contact drive wheel or roller 36 above the wire electrode L and in contact therewith. Also, an opening 30c is provided below the opening 30b for the positioning of an adjustable contact roller 37 below the drive wheel 36 so that the wire electrode L is adapted to pass between the drive wheel 36 and the adjustable roller 37, as will be more fully explained.

The roller 37 is adjustable by reason of its mounting on a yoke 38 which is formed integrally with or is otherwise suitably secured to an upper shaft 39 which is mounted in engagement with but separate from a lower threaded rod 39a. Such threaded rod 39a extends into internal threads 40a of a nut or sleeve 40 which is welded or otherwise secured as indicated at 40a to the bottom plate 10. Such nut or sleeve 40 extends through a suitable opening 10b in the bottom plate 10. By a rotation of a handle 39b on the lower end of the threaded rod 39, the upper shaft 39 is moved upwardly and downwardly and therefore the wheel 37 is moved upwardly and downwardly so as to adjust the space between the roller 36 and the roller 37 to assure a firm contact of the rollers 36 and 37 with the wire electrode L. It is to be noted that the upper shaft 39 is preferably square or splined and extends through a corresponding square or splined opening 40c in the sleeve 40 to prevent a rotation of the shaft 39 during the rotation of the lower rod 39a so that the wheel 37 remains in the same position as shown in the drawings as it is moved upwardly and downwardly by the movement of the threaded rod 39a. A lock nut 41 is provided on the threaded shaft 39a for locking the rod 39a and therefore the roller 37 in each set position.

The drive wheel 36 is mounted on a shaft or axle 42 which is positioned in roller bearings 43 and 44 in the preferred form of the invention. The axle or shaft 42 extends beyond the bearing 44 and the vertical frame portion 22a, and is provided with a reduced diameter section 42a which is externally threaded for receiving a nut 45, the purpose of which will be described more in detail hereinafter.

The nozzle support mounting 31 has external threads 31a at its upper end which are adapted to engage internal threads 46a in a nut 46 which is welded at 46b to the bottom plate 10 at an angle as shown in FIG. 1. A nozzle 47 is slidably mounted in the bore 31b of the mounting tube 31 and is held in a desired position by a set screw 31c. The nozzle 47 is shown in a simplified form and may be of any desired or known construction so that the wire electrode L is adapted to extend outwardly therefrom below the lower end of the nozzle 47 as shown in FIG. 1. The electrical current for the wire electrode L for the melting of same is supplied through an electrical conductor 50 which is connected to the housing H by any suitable means such as the clamp 51 illustrated in FIG. 1. The electrical circuit to the wire electrode L is completed by another electrical conductor 52 which is welded or is otherwise secured to the material M which is being welded. Both of the wires 50 and 52 extend to the welding machine (not shown) which provides for the automatic or semi-automatic welding.

The weld composition feeding mechanism W of the apparatus A includes a hopper or container 50 which is secured in the housing H by means of metal screws 51 or any other similar retaining means. The upper end of the hopper or container 50 is open so that when the cover 16 is raised, the hopper 50 may be filled with the welding composition C. Such welding composition C is in a finely divided state such as a granular form or a powder form in the normal case. Various types of welding compositions may be employed in carrying out the method of this invention, as will be more fully explained, and such types are disclosed in the aforesaid patent application Serial No. 39,193, now abandoned. The hopper 50 has downwardly converging lower walls 50a which converge towards an opening 50b. A spout 52 in the form of a downwardly extending substantially L shaped tube is provided through which the composition C is adapted to move for feeding the composition from the hopper 50 to the area therebelow. A feed wheel 55 is mounted below the hopper 50 on the reduced diameter portion 42a of the axle or shaft 42, and the nut 45 holds the feed wheel 55 on such portion 42a. The feed wheel 55 has a plurality of recesses or pockets 55a formed in the periphery thereof for receiving and discharging the welding composition C. Such recesses 55a are inclined at an angle with respect to radius lines passing through the center of the wheel 55. The angle of inclination of the recesses 55a is such that when the wheel 55 rotates counterclockwise as viewed in FIG. 3, powder or other finely divided material such as the welding composition C is picked up by the recesses 55a in the right portion of the wheel 55 and is carried over to the left portion of the wheel 55 for discharging. In other words, as the recesses or pockets 55a move during the movement of the wheel 55, the composition C is confined in the pockets 55a for a portion of the travel and is then dumped therefrom at another portion of the travel of the wheel 55. The spout 52 from the hopper 50 is positioned so as to discharge the composition C adjacent to the periphery of the wheel 55 as the recesses or pockets 55a move past such spout 52 to pick up the composition C. Also, a cup or dish 56 is welded or is otherwise secured to the vertical frame 22a and is positioned below the wheel 55 and the spout 52 for accumulating the composition C so that the pockets or recesses 55a may initially pick up some of the composition C from the accumulated composition C in the dish or cup 56.

A powder feed tube 60 is mounted with its open upper end adjacent to the discharge portion of the wheel 55 as shown in FIG. 3 so that the discharge welding composition is dumped or dropped into the tube 60 for feeding to the material M. Such tube 60 is cylindrical or otherwise shaped for providing a channel through which the welding composition C moves after it is placed therein from the wheel 55. A gate 61 is pivotally mounted at the upper end of the tube 60 for closing off the flow of the granular or powdered composition C to the tube 60 when desired. Such gate 61 is pivoted on a pivot rod 61a which is connected to a wheel or handle 62 (FIG. 1) mounted on the outer side plate 14. Indicator marks 14a and 14b may be provided on the external surface of the plate 14 to indicate when the gate 61 is in the open and the closed positions, respectively. As shown in FIG. 3, the gate 61 is illustrated in solid lines to show the open position and in dotted lines to show the closed position. It will be observed that the gate 61 actually contacts the lip 56a of the cup or dish 56 when the gate 61 is in the closed position so that any of the composition C which is picked up by the pockets or recesses 55a is returned to the cup C when the gate 61 is closed. A semi-circular opening 60a is provided at the upper end of the tube 60 for permitting the movement of the gate 61 from the closed position to the open position. The tube 60 is preferably secured in position on the vertical frame portion 22a by retaining straps 60b which are held in place on the frame 22a with screws 60c or other suitable securing means. A composition tube extension 65 is secured to the tube 60 by a coupling or nut 66 or any other suitable means so that the extension 65 may be replaced if desired. The extension 65 is curved in the usual arrangement for discharging the composition C at a point ahead of the wire electrode. However, the tube extension 65 may be turned or bent to direct the composition C to the area on the plate M below the electrode L, or fed into the weld zone concentrically with and surrounding the electrode, if desired.

In the operation of the apparatus of this invention, and in carrying out the method thereof, the desired constituents or components of the final weld 70 on the material M, whether a fusion weld as indicated in FIG. 2 or a hard facing coating or similar welding coat, is determined in advance. Then, the constituents of the weld are provided by putting such constituents in the welding composition C and in desired percentages in the welding composition C and by allowing for the material to be deposited by the melting of wire electrode L during welding which also forms a part of the final weld 70. Since the material of the welding electrode L is a part of the final weld 70, the rate at which the welding composition C is fed and the rate at which the welding electrode L is fed to the material M during the welding determines the final percentages of the constituents in the final weld 70. For example, if the wire electrode L is fed to the material M during the welding procedure at a rate of one ounce per minute or other increment of time, then the welding composition C is fed to the material M so that two ounces of such composition, or such other amount as is calculated to be necessary for the ultimate analysis in the weld 70, is fed to the material M for each minute or other increment of time.

With the apparatus of this invention, the feeding of the wire electrode L and the feeding of the welding compotion C are coordinated, and normally are maintained at the same rate. Such coordination is accomplished with the apparatus A because as the wire electrode L is fed between the rollers 36 and 37, rotation is imparted to the drive wheel 36 which is transmitted through the shaft or axle 42 to the feed wheel 55. As the feed wheel 55 moves, it picks up the composition C in the pockets 55a during a portion of its travel, as previously explained, and then dumps such composition C into the tube 60. When the wire electrode L is fed continuously, the picking up and dumping of the composition C is also continuous since the movement of the wheel 55 is in direct response to the movement of the wire electrode L. When the size and number of the pockets 55a in a particular feed wheel 55 are fixed, the amount of the composition C which is fed to the material M is thus directly related to the rate of movement of the wheel 55 and the rate of movement of the electrode L. However, wheels with different sizes and numbers of pockets may be used instead of the wheel 55 for feeding different amounts of the composition C to the material M so as to obtain a different final analysis in the weld 70.

For facilitating the changing of such wheel 55, the plate 15 is removable by removing the screws or bolts 19, as previously explained. In that way, the wheel 55 is readily visible and accessible so that by removing the nut 45, the wheel 55 may be removed and another wheel may be substituted therefor. It can thus be seen that the final analysis of the alloy weld or other weld which is applied to the material M may be varied by either varying the initial percentages of the components in the composition C or by varying the particular wheel 55 so that a different amount of the composition C is discharged from the wheel 55 to the tube 60 for a given speed of movement of the wheel 55. In any event, it will be understood that in accordance with the method of this invention, the feeding of the welding composition C in the finely divided state such as a granular form or a powdered form is coordinated with the feeding of the wire electrode automatically so as to produce a controlled analysis in the final weld. Since the known types of semi-automatic and automatic welding equipment control the rate of feeding of the wire electrode L, the wire electrode L is actually moved through the apparatus A by reason of the feeding from the semi-automatic or automatic welding equipment. However, power could be supplied by a motor or other source to the drive wheel 36 to cause the movement of the electrode L through the apparatus A instead of depending upon the feeding from the semi-automatic or automatic welding equipment. In either event, the drive wheel 36 would transmit the movement thereof to the feed wheel 55 which would be in response to the feeding of the wire electrode L through the apparatus A.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for use in welding, comprising a feeding container containing welding particles, a rotatable feed wheel extending into said container in contact with the welding particles, said wheel having at least one pocket in its periphery disposed at an angle to a radius line from the rotational axis of said wheel for picking up and discharging from said container a predetermined quantity of the welding particles, a discharge spout having one inlet thereof disposed adjacent to the point of discharge of said pocket for receiving the welding particles discharged therefrom during the rotation of said feed wheel, said discharge spout having an outlet for depositing the welding particles on a material to be welded or weld-coated, means for directing a wire electrode to said material at an area adjacent the deposited welding particles, and means for coordinating the rotation of said feed wheel and said means for directing said wire electrode.

2. An apparatus for use in welding, comprising a feeding container containing welding particles, a rotatable feed wheel extending into said container in contact with the welding particles, said wheel having a plurality of pockets in its periphery each of which is disposed at an angle to a radius line from the rotational axis of said wheel for picking up and discharging from said container a predetermined quantity of the welding particles, a discharge spout having one inlet thereof disposed adjacent to the point of discharge of said pockets for receiving the welding particles discharged therefrom during the rotation of said feed wheel, said discharge spout having an outlet for depositing the welding particles on a material to be welded or weld-coated, means for directing a wire electrode to said material at an area adjacent the deposited welding particles, and means for coordinating the rotation of said feed wheel and said means for directing said wire electrode.

3. An apparatus for use in welding, comprising a feeding container containing welding particles, a hopper for holding a supply of the welding particles, means for feeding the welding particles to said feeding container to maintain a predetermined quantity of the welding particles in said container, a rotatable feed wheel extending into said container in contact with the welding particles, said wheel having at least one pocket in its periphery disposed at an angle to a radius line from the rotational axis of said wheel for picking up and discharging from said container a predetermined quantity of the welding particles, a discharge spout having one inlet thereof disposed adjacent to the point of discharge of said pocket for receiving the welding particles discharged therefrom during the rotation of said feed wheel, said discharge spout having an outlet for depositing the welding particles on a material to be welded or weld-coated, means for directing a wire electrode to said material at an area adjacent the deposited welding particles, and means for coordinating the rotation of said feed wheel and said means for directing said wire electrode.

4. An apparatus for use in welding, comprising a feeding container containing welding particles, a hopper for holding a supply of the welding particles, means for feeding the welding particles to said feeding container to maintain a predetermined quantity of the welding particles in said container, a rotatable feed wheel extending into said container in contact with the welding particles, said wheel having a plurality of pockets in its periphery each of which is disposed at an angle to a radius line from the rotational axis of said wheel for picking up and discharging from said container a predetermined quantity of the welding particles, a discharge spout having one inlet thereof disposed adjacent to the point of discharge of said pockets for receiving the welding particles discharged therefrom during the rotation of said feed wheel, said discharge spout having an outlet for depositing the welding particles on a material to be welded or weld-coated, means for directing a wire electrode to said material at an area behind the deposited welding particles, and means for coordinating the rotation of said feed wheel and said means for directing said wire electrode.

5. An apparatus for use in welding, comprising a feeding container containing welding particles, a rotatable feed wheel extending into said container in contact with the welding particles, said wheel having at least one pocket in its periphery disposed at an angle to a radius line from the rotational axis of said wheel for picking up and discharging from said container a predetermined quantity of the welding particles, a discharge spout having one inlet thereof disposed adjacent to the point of discharge of said pocket for receiving the welding particles discharged therefrom during the rotation of said feed wheel, said discharge spout having an outlet for depositing the welding particles on a material to be welded or weld-coated, means including a roller in contact with a wire electrode for directing the wire electrode to the material, and a shaft connecting said roller and said feed wheel for rotation together so that the rotation of said roller imparts rotation to said feed wheel as said wire electrode is fed to the material.

6. An apparatus for use in welding, comprising a rotatable feed wheel having a plurality of peripheral pockets, each of said pockets extending at an angle with respect to a radius line passing therethrough, each of said pockets being of a predetermined size for picking up and discharging a predetermined quantity of welding particles therefrom, and means for directing the particles discharged from said feed wheel to a material to be welded or weld-coated.

7. An apparatus for use in welding, comprising a hopper for a particulate welding composition including nonmagnetic components, means for discharging the welding composition from said hopper, a feed wheel having a plurality of pockets in the periphery thereof for picking up the discharged welding composition at one area of travel and for dumping it at another area of travel, and means for guiding the composition when it is dumped from said feed wheel to said material to be welded.

8. An apparatus for use in welding, comprising a movable feeding wheel adapted to feed predetermined quantities of a welding material, a pair of rollers adapted to be contacted by a wire electrode fed therebetween, and a shaft means connecting one of said rollers to said feeding wheel for thereby moving said feeding wheel to feed the welding material at a rate coordinated with the rate of feeding of the wire electrode between said pair of rollers.

9. The structure set forth in claim 8, wherein one of said pair of rollers is adjustable with respect to the other of said rollers for adjusting the space therebetween whereby contact with the wire electrode by said rollers is maintained for wire electrodes of different diameters.

References Cited in the file of this patent

UNITED STATES PATENTS 2,766,360    Landis et al. _____ Oct. 9, 1956

FOREIGN PATENTS 394,773    Great Britain _____ July 6, 1933
472,363    Great Britain _____ Sept. 22, 1937
799,330    Great Britain _____ Aug. 6, 1958